Oct. 30, 1951  R. T. RENFRO, SR  2,573,109
MINNOW BUCKET
Filed Feb. 4, 1947  2 SHEETS—SHEET 1
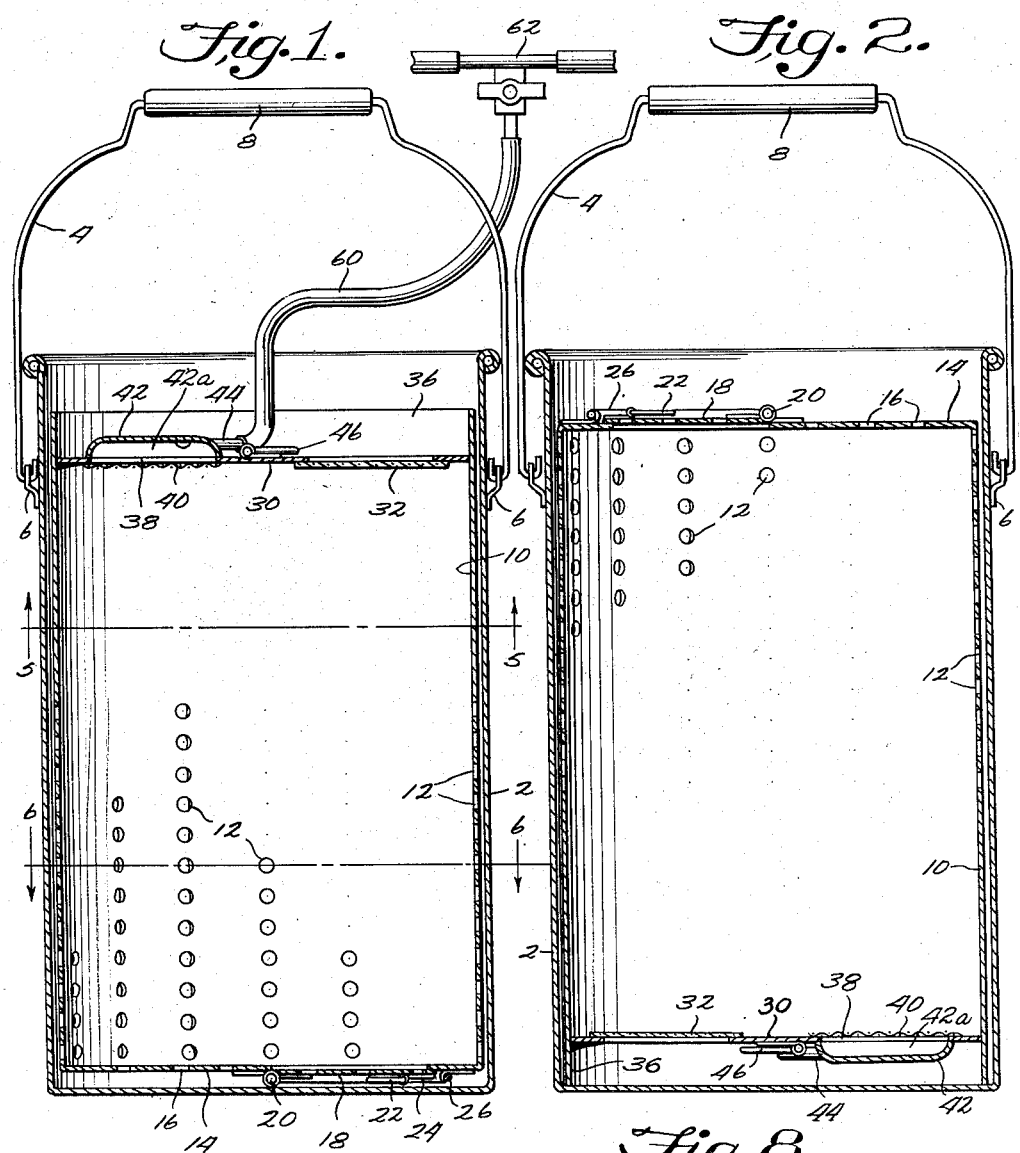
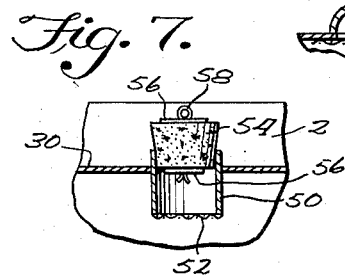
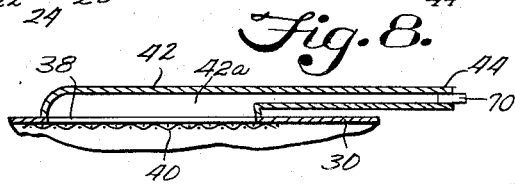
INVENTOR.
Ralph T. Renfro Sr.,
BY Victor J. Evans & Co.
ATTORNEYS Oct. 30, 1951  R. T. RENFRO, SR  2,573,109
MINNOW BUCKET Filed Feb. 4, 1947  2 SHEETS—SHEET 2

INVENTOR.
Ralph T. Renfro Sr.,
BY Victor J. Evans & Co.
ATTORNEYS

UNITED STATES PATENT OFFICE 2,573,109

MINNOW BUCKET

Ralph T. Renfro, Sr., Boise, Idaho, assignor to Scruggs and Vaughan Manufacturing Company, Inc., Phoenix, Ariz., a corporation of Arizona Application February 4, 1947, Serial No. 726,282

1 Claim. (Cl. 43—56)

My present invention relates to an improved minnow bucket and more especially to a container in which live bait and particularly minnows may be confined and transported during a long period of time without harmful effects on the bait.

Normally as is well known, minnows and other forms of live bait will not thrive in water unless the water is aerated to renew the oxygen supply and it is the principal purpose of my invention to provide a structure so arranged that aeration may be accomplished with facility and ease.

In the accompanying drawings I have illustrated one complete example of the physical embodiment of my invention according to the best mode I have thus far devised, but it will be understood that various changes and alterations may be made in the exemplified structure within the scope of the appended claim.

In the drawings—

Figure 1 is a vertical sectional view on the line 1—1 of Fig. 3 of the carrier with the inner container in position to receive a vacuum line.

Figure 2 is a similar view with the container inverted.

Figure 7 is a sectional view at line 7—7 of Fig. 3.

Figure 8 is a sectional view at line 8—8 of Fig. 3.

Figure 3:
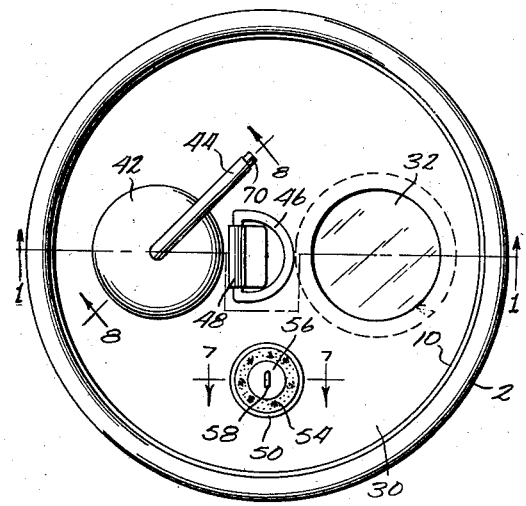
Figure 3 is a top plan view of the structure of Fig. 1.
Figure 4:
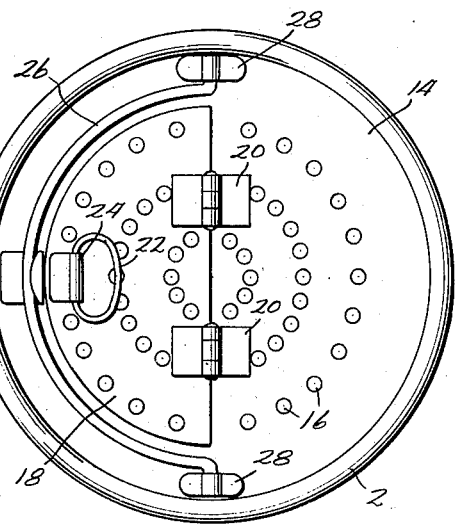
Figure 4 is a top plan of the structure of Fig. 2.
Figure 6:
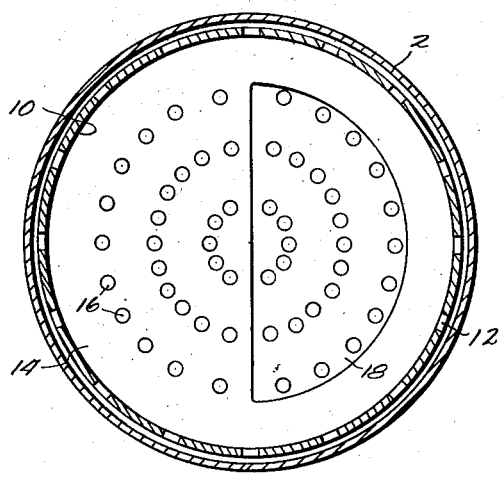
Figure 6 is a sectional view at line 6—6 of Fig. 1.
Figure 5:
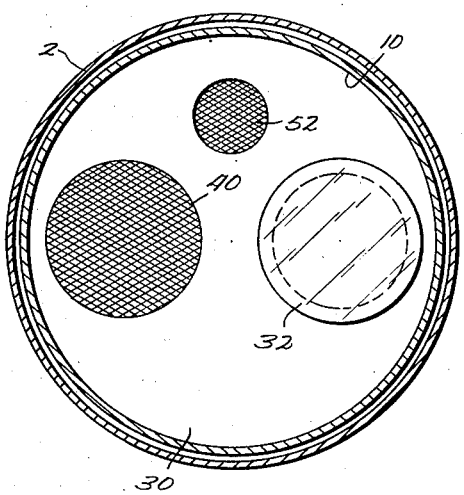
Figure 5 is a sectional view at line 5—5 of Fig. 1.

Referring now to the drawings I have illustrated the present preferred form of my invention as comprising the bucket or pail 2 having a bail 4 secured in plates 6, and having a handle 8.

Adapted for use within this pail I use a preferably metal container 10 having series of perforations 12 extending from one end to a point beyond the center thereof.

The fully perforated end of the container is closed at 14, the closure being perforated at 16, and a door 18 is hinged at 20 to the closure. A ring 22 secured at 24 on the door facilitates the opening thereof. A bail 26 is secured in brackets 28 on the container so that the container may easily be removed from the pail.

At the other end of the container I use an end wall 30 having a window 32 therein, the end wall being positioned at a point inside the container to form with the container wall a recess 36.

An opening 38 is screened at 40 and covering this opening is a concavo-convex cap 42 having a chamber 42a therein, and the cap is suitably secured to the end wall and has a pipe 44 integral therewith and communicating with the chamber in the cap.

A lifting ring 46 is secured in bracket 48 and a cylindrical tube 50 through the end wall is screened at 52 and designed to receive the cork 54 retained in shape by washers 56 secured by cotter pin 58.

With the container positioned as shown in Fig. 1 and when it is desired to aerate the water for the minnows therein a rubber tube 60 is connected to a suitable vacuum source as an automobile intake manifold by means of a T-shaped valve cock 62. In mounting the valve cock 62, the tubing 63 leading from the windshield wiper motor to the vacuum manifold is severed, and the cock 62 is inserted in the tubing 63 intermediate of the severed ends thereof. Therefore the suction used to ordinarily operate the windshield wiper motor will draw air through the perforations from the space between the pail and the container, the movement of air through the water fully freshening the water and aerating the same thus increasing the length of the minnow's life. When aeration of the water is no longer required the valve cock 62 is closed and the tubing 63 to the windshield wiper motor will operate the motor in the usual manner, since the valve cock 62 remains permanently fixed in the tubing at all times. The tubing 60 is removed from the valve cock 62 when the bucket is removed from the automobile for fishing or other purposes.

When the pail is being carried by hand to the boat or in the boat for fishing, the container is inverted as seen in Fig. 2, the recess forming a protection for the pipe of the suction chamber, and a suitable stopper 70 may be inserted in the end of pipe 44 to prevent leakage of the contents of the pail.

When actually fishing the container is removed from the pail and supported in the body of water or from a boat.

The level of water will be maintained at a point below the suction inlet to prevent water from being drawn into the pipe and the recess at the end of the container will prevent water from splashing into the suction hose.

Having thus fully described my invention what I claim as new and desire to secure by Letters Patent is:

A minnow bucket for use with the intake manifold of an internal combustion engine, comprising a pail for water, a perforated container closely fitting into the pail, end closures for the container, one of said closures being intermediate the container to form with the container wall an end recess, a concavo-convex cap closing an opening in the intermediate closure, a pipe on said cap and communicating therewith, and flexible hose connections from said pipe to the intake manifold whereby air will be drawn through the perforations and the water in the pail, and said pipe terminating above the water level in the container and the perforations terminating below the water level and communicating with the atmosphere to permit the ingress of air under vacuum pressure created by the intake manifold, the open end of the wall of the container being a greater distance from the adjacent intermediate closure than the height of the cap and pipe whereby when the container is in reverse position in the pail said open end will maintain the cap and pipe in spaced relation to the bottom of the pail.

RALPH T. RENFRO, Sr.

REFERENCES CITED

The following references are of record in the file of this patent:

UNITED STATES PATENTS

| Number | Name | Date |
|---|---|---|
| 1,288,393 | Di Sante | Dec. 17, 1918 |
| 1,604,971 | Churchill et al. | Nov. 2, 1926 |
| 1,794,842 | Foster | Mar. 3, 1931 |
| 2,007,326 | Carpenter | July 9, 1935 |
| 2,303,757 | Pierson | Dec. 1, 1942 |
| 2,341,246 | Stowe | Feb. 8, 1944 |
| 2,489,818 | Roe | Nov. 29, 1949 |